June 13, 1944.   C. H. WHITE   2,351,173
FURROW OPENER FOR PLANTERS AND THE LIKE
Original Filed July 8, 1940

INVENTOR
CHARLES H. WHITE
BY
ATTORNEYS

Patented June 13, 1944

2,351,173

UNITED STATES PATENT OFFICE 2,351,173

FURROW OPENER FOR PLANTERS AND THE LIKE

Charles H. White, Moline, Ill., assignor to Deere & Company, Moline, Ill., a corporation of Illinois Original application July 8, 1940, Serial No. 344,310. Divided and this application November 30, 1942, Serial No. 467,450

15 Claims. (Cl. 111—85)

This application is a division of my co-pending application, Serial No. 344,310, filed July 8, 1940, for Planters, now U. S. Patent No. 2,322,332, issued June 22, 1943.

The present invention relates generally to agricultural machines and is more particularly concerned with planters and other implements having furrow openers.

The object and general nature of the present invention is the provision of an agricultural machine, such as a planter, having a new and improved furrow opener. More particularly, it is a feature of this invention to provide a simple inexpensive furrow opener, especially adapted for attachment to the shank of a planter sweep. Further, it is a feature of this invention to provide such a furrow opener with means to receive the end of a fertilizer tube. Another feature of this invention is the provision of a trash shield particularly adapted to be secured to the sweep shank in position to protect the fertilizer tube that is connected through said furrow opener to said shank. Still further, it is a feature of this invention to provide a planter of the sweep type in which both a fertilizer furrow opener and a fertilizer tube protecting shield are fixed to the same side of the sweep shank.

These and other objects and advantages of the present invention will be apparent to those skilled in the art after a consideration of the following detailed description of the preferred structural embodiment, taken in conjunction with the accompanying drawing in which the preferred structural embodiment has been illustrated.

Figure 1:
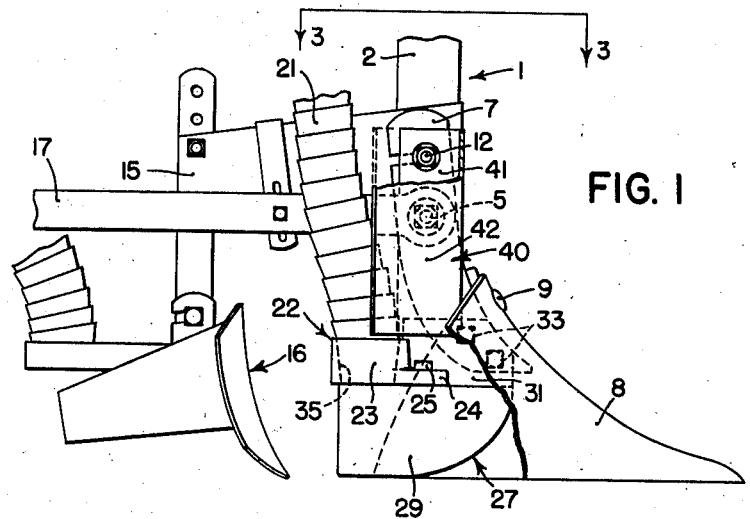
Figure 1 is a fragmentary side view of a sweep and a sweep shank of a planter, showing the fertilizer furrow opener and the fertilizer spout shield.
Figure 3:
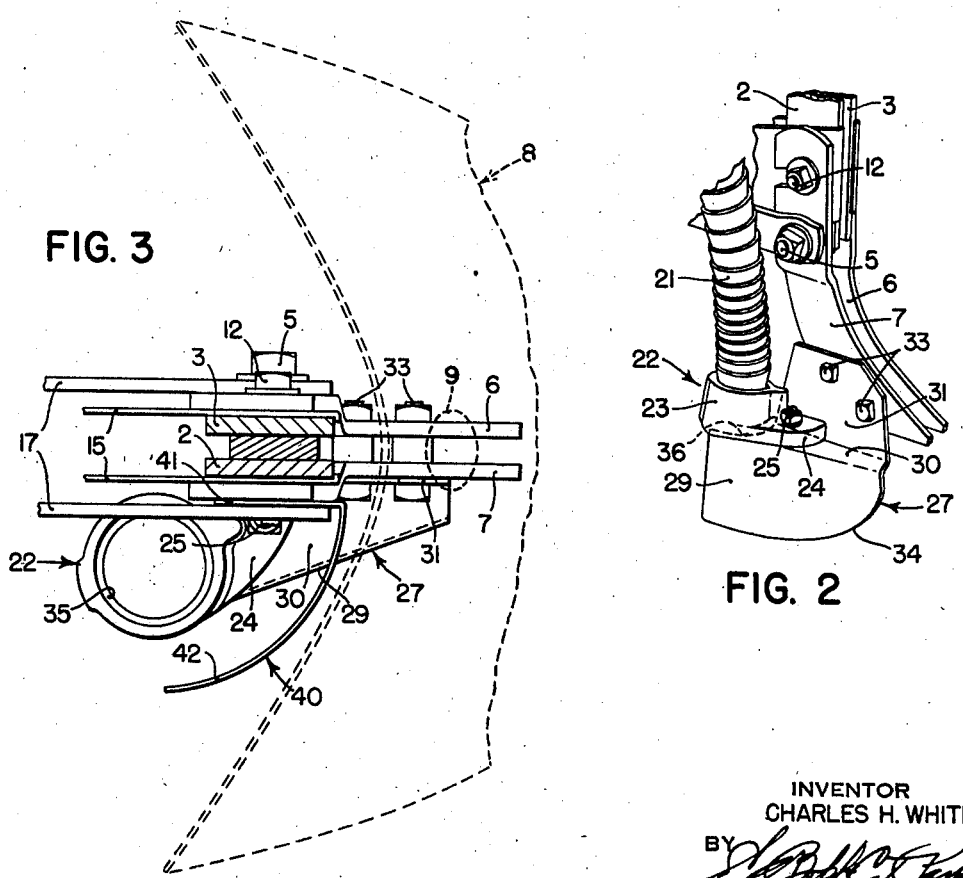
Figure 3 is a view taken along the line 3—3 of Figure 1.

In order to illustrate the present invention, I have shown at 1 the tool shank or standard of a planter, such as a tractor mounted planter like that disclosed in my parent co-pending application identified above. Preferably, the shank 1 comprises a pair of bars 2 and 3 suitably secured together and apertured to receive a pivot bolt 5 by which a pair of curved tool-receiving shank bars 6 and 7 are swingably connected to the standard 1. The bars 6 and 7 are adapted to receive a tool, such as a sweep 8, and the bars 6 and 7 are spaced apart to receive a bolt 9 securing the sweep 8 in place. The bars 6 and 7 are slotted at their upper ends and a clamping bolt 12 passes through the slots and openings in the standard bars 2 and 3 for frictionally holding the shank bars 6 and 7 against pivoting on the bolt 5.

The shank or standard 1 is mounted for generally vertical movement, and carries rearwardly extending brackets 15 to receive a seed furrow opener 16, which normally is disposed rearwardly in the vertical longitudinal plane of the standard 1. The latter also carries bars 17 forming a coverer frame which may be pivoted on the bolt 5.

Figure 2:
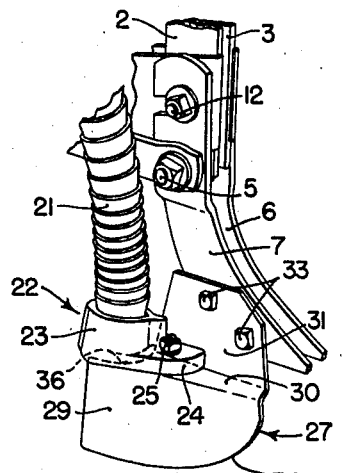
Figure 2 is a perspective view showing the fertilizer furrow opener and its method of attachment to the sweep shank.

According to the principles of the present invention, new and improved fertilizer furrow opener and fertilizer tube protecting means are provided for attachment to one side of the standard 1. A fertilizer tube 21 leads downwardly from the fertilizer distributing means (not shown) and connects at its lower end to a fertilizer boot 22 which includes a tube-receiving collar 23 and an attaching lug 24. As best shown in Figure 2, the lug is apertured to receive a bolt 25 by which the boot is fastened to a fertilizer furrow opener 27.

The fertilizer furrow opener 27 is of simple and inexpensive construction and as shown is in the general form of a Z-plate, having a ground engaging section 29, a horizontal boot-receiving shelf section 30, and an upwardly extending attaching or bracket section 31. The attaching section 31 is apertured to receive bolts 33, which secure the fertilizer furrow opener to the sweep shank bars, and the sections 29 and 31 lie in planes that converge forwardly so that when attached the furrow opener section 29 is disposed at an angle to the line of normal forward travel. The section 29 is cut away forwardly, as at 34, to form a generally V-shaped furrow. The shelf section 30 of the fertilizer furrow opener is apertured to receive the bolt 25, whereby the boot 22 is disposed in the proper position, the lug 24 being formed to lie substantially against one side of the attaching section 31, as best shown in Figure 2. This prevents the boot 22 from turning out of position. The outlet 35 (Figure 1) of the boot discharges rearwardly of the rear edge 36 (Figure 2) of the shelf section 30.

It is to be noted that since the seed furrow opener 16 is disposed rearwardly in the longitudinal vertical plane of the standard 1, the attachment of the fertilizer boot 22 to the horizontal shelf section 30 of the fertilizer furrow opener 27 disposes the fertilizer furrow to one side of the seed furrow, which is the preferred placement, yet the fertilizer furrow opener is a simple inexpensive part, easily formed of sheet stock rapidly and at low cost.

Since the fertilizer tube 21, at least the lower portion thereof, is thus required to be disposed laterally of the standard 1, it is deemed desirable, according to the present invention, to protect the fertilizer tube from trash and dirt coming over the sweep 8 by means of a curved shield 40 which has an attaching section 41 apertured to receive the bolts 5 and 12 and by which the shield 40 may be secured to the same side of the standard 1 against which the fertilizer furrow opener is secured, and substantially directly above the latter. The shield 40 includes a protecting section 42 which is disposed in front of the tube 21 and extends well below the upper edge of the sweep 8. Like the fertilizer furrow opener, the shield 40 may be formed easily and inexpensively from sheet stock.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter having a tool beam and a sweep attached to the lower end thereof, a spout shield comprising a member having an attaching section and a laterally directed section adapted to be disposed in front of a spout disposed at one side of said tool beam, means for fixing said attaching section to said tool beam so that the lower end of said shield extends below the upper edge of said sweep and said laterally directed shield section is in front of and protects the spout from trash, dirt and the like coming over the sweep, and a furrow opener fixed to said beam behind the sweep and having a laterally extending spout-receiving section below said shield in a position to support said spout behind said shield.

2. A fertilizer furrow opener adapted to be attached to a tool beam, comprising a plate member having an upper attaching section, a generally laterally directed fertilizer tube receiving section and a ground engaging blade section adapted to be disposed at an angle to the line of advance when said attaching section is connected to said tool beam.

3. In a planter having a furrow opener shank and a spout disposed at one side thereof, a spout shield adapted to be connected to the furrow opener shank of the planter and comprising a substantially flat attaching section adapted to be attached to one side of said shank and a laterally outwardly and rearwardly extending section adapted to be disposed forward of the spout to protect the latter from trash and the like.

4. In a planter having a tool beam, coverer frame means carried by said tool beam, a spout disposed at one side of said coverer frame means and said tool beam, and a sweep attached to the lower end thereof, a spout shield comprising a member having an attaching section adapted to be fixed at one side of said tool beam and a laterally outwardly disposed section adapted to be disposed in front of the spout, and means for fixing said attaching section to said tool beam at said one side thereof so that the laterally outward section is disposed in front of the spout and protects the spout from trash, dirt and the like coming over the sweep.

5. A generally vertically movable tool-carrying member, a ground working sweep connected to the lower end of said tool carrying member, a planter furrow opener fixed to said tool carrying member substantially directly in the longitudinal center plane of said sweep, a fertilizer furrow opener comprising a fertilizer tube receiving and ground engaging section disposed laterally of said plane and at one side of said tool-carrying member so as to deposit fertilizer at one side of the seed and connected with the associated tool-carrying member at one side thereof, and a shield attached to said tool-carrying member at said one side thereof, above said fertilizer furrow opener for protecting the fertilizer tube when connected to the laterally disposed section of the fertilizer furrow opener.

6. In a planter having a tool beam and a sweep attached to the lower end thereof, a furrow opener connected therewith and having a generally laterally directed tube receiving section, a tube connected therewith and disposed generally at one side of said tool beam, and a shield attached to said beam in front of the lower end of said tube and below the upper edge of said sweep so as to protect the laterally disposed tube from trash, dirt and the like coming over the sweep.

7. In a planter having a tool shank and a tube extending alongside said shank at one side thereof, a shield having an attaching section adapted to fit against said one side of the tool shank and a generally laterally extending tube-protecting section.

8. A tube-protecting shield for the tube of a planter or the like, comprising a generally flat rearwardly extending attaching section and a curved laterally and rearwardly extending section.

9. A spout shield comprising a flat attaching section and a curved spout-protecting section, the generatrix of said curved section being generally parallel to the plane of said flat attaching section so as to facilitate forming said shield from flat stock.

10. A fertilizer furrow opener adapted to be attached to a tool beam, comprising a plate member having an upper attaching section, a generally horizontal V-shaped shelf portion, and a ground engaging blade section, said sections lying in forwardly converging planes.

11. In a planter, a fertilizer furrow opener adapted to be attached to a tool beam, comprising a plate member having an upper attaching section, a generally laterally directed fertilizer tube-receiving section and a ground engaging blade section adapted to be disposed at an angle to the line of advance when said attaching section is connected to said tool beam, a fertilizer boot having an attaching lug and a discharge passage, and means connecting said lug with said tube-receiving section so as to dispose said passage rearwardly of the rear edge of said laterally directed tube-receiving section.

12. In a planter having a tool beam and a tool attached to the lower end thereof, a spout shield comprising a member having an attaching section and a laterally directed section adapted to be disposed in front of a spout disposed at one side of said tool beam, means for fixing said attaching section to said tool beam so that the lower end of said shield extends below the upper edge of said tool and said laterally directed shield section is in front of and protects the spout from trash, dirt and the like coming over the tool, and a furrow opener fixed to said beam behind the sweep and having a spout-receiving section in a position to support said spout behind said shield.

13. In a planter having a tool beam and a sweep attached thereto, a fertilizer furrow opener adapted to be attached to one side of said tool beam behind said sweep, comprising a plate member having an upper attaching section, a generally laterally directed fertilizer tube-receiving section and a ground engaging blade section adapted to be disposed at an angle to the line of advance when said attaching section is connected to said tool beam, a fertilizer boot, means connecting said fertilizer boot with said laterally directed tube-receiving section, a tube extending downwardly at said one side of said tool beam and connected to said fertilizer boot, and a shield also fixed to said beam and including a laterally directed section disposed behind and extending above said sweep and disposed in front of said tube.

14. In a planter, a tool beam having a sweep attached thereto, coverer frame means extending rearwardly therefrom, a planter furrow opener connected with said coverer frame means substantially directly rearwardly behind said tool beam, a fertilizer furrow opener connected to one side of said tool-carrying member so as to deposit fertilizer at one side of the seed and connected with the associated tool beam at one side thereof, and a fertilizer tube extending downwardly at one side of said coverer frame means to said fertilizer furrow opener.

15. The invention set forth in claim 14, further characterized by a tube shield fixed at said side of the tool beam behind the sweep but over the fertilizer furrow opener and in front of said tube.

CHARLES H. WHITE.